United States Patent [19]

Zwicker

[11] Patent Number: 4,698,940
[45] Date of Patent: Oct. 13, 1987

[54] SANDBLAST SHUTOFF VALVE

[75] Inventor: Fred Zwicker, Canfield, Ohio

[73] Assignee: Truman's Inc., Canfield, Ohio

[21] Appl. No.: 925,417

[22] Filed: Oct. 31, 1986

[51] Int. Cl.$^4$ ............................................. B24C 5/02
[52] U.S. Cl. ..................................... 51/438; 251/303;
137/527; 51/427
[58] Field of Search .................. 51/438, 427, 410, 439,
51/415; 251/339, 298, 177, 303, 336, 337, 356,
175; 137/527, 904

[56] References Cited
U.S. PATENT DOCUMENTS 2,247,773  7/1941  Dunn ................................. 137/904
2,989,283  6/1961  Klinger ............................. 251/303

Primary Examiner—Frederick R. Schmidt
Assistant Examiner—Maurina Rachuba
Attorney, Agent, or Firm—Harpman & Harpman

[57] ABSTRACT

A shutoff valve for use on sandblasting equipment wherein the valve provides a fail safe positive closure of air and sand pressure stream at the nozzle where the operator is. The sand and air pressure stream provides a positive force on the valve assisting the closure and maintaining a tight seal against air and sand infiltration to the nozzle.

5 Claims, 3 Drawing Figures and shape of the ball stop holder 34 as hereinbefore described.

SANDBLAST SHUTOFF VALVE

This is a continuation-in-part of patent application Ser. No. 06/761,759, now abandoned.

BACKGROUND OF THE INVENTION

1. Technical Field

This invention relates to shutoff nozzle valves for sandblasting equipment of the type used to control the air and sand pressure flow at the users point of use.

2. Description of the Prior Art

Prior Art devices of this type have relied on a variety of configurations, such as a ball valve using teflon or urethane seals, all of which leak and become unstable after a short exposure to the air and sand mix.

Other valves rely on a variety of different structures, see for example U.S. Pat. Nos. 2,641,087, 4,269,359, 2,989,283, 2,247,773 and a nozzle shutoff valve manufactured by P. K. Lindsay, Inc., Model 66E-V-D.

In U.S. Pat. No. 2,641,087, a valve is disclosed which uses a hose pinching mechanism which restricts the air and sand flow stream by progressively reducing the opening in a resilient tube by pinching the tube with a movable arm.

U.S. Pat. No. 4,269,359 shows a nozzle shutoff valve having a resilient pad movably positioned on to the end opening in a sandblast nozzle. A spring urged arm moves the pad into an exterior sealing relation by the activation of a lever control held by the operator on the nozzle grip.

In U.S. Pat. No. 2,989,283 a self sealing fluid valve configuration is shown wherein a resilient conduit is formed in which a resilient ball valve is positioned.

U.S. Pat. No. 2,247,773 discloses a fluid swing check valve having a closure member on a hinge to seal an opening by engagement with a annular valve seat. This valve is designed for use in non-abrasive fluid flow environments.

In Lindsay Company, valve M-66E-V-D a movable arm having a sealing element is positioned in the air sand flow sealing the same. The sealing element is a combination of a steel washer, rubber washer and valve stem.

Applicant's device is a self closing valve that provides a positive shutoff of the air and sand stream regardless of the valve position upon actuation.

SUMMARY OF THE INVENTION

A shutoff valve for use exclusively with sandblasting equipment that provides a fail safe positive shutoff of the sand and air stream at the nozzle site. The valve utilizes a pressure urged valve element that resist wear and associated leakage by reducing exposure to stream intraned abrasive material by a unique sealing configuration that imparts a wear reducing stream flow configuration around the valve element and seat.

DESCRIPTION OF THE PREFERRED EMBODIMENT

Figure 1:
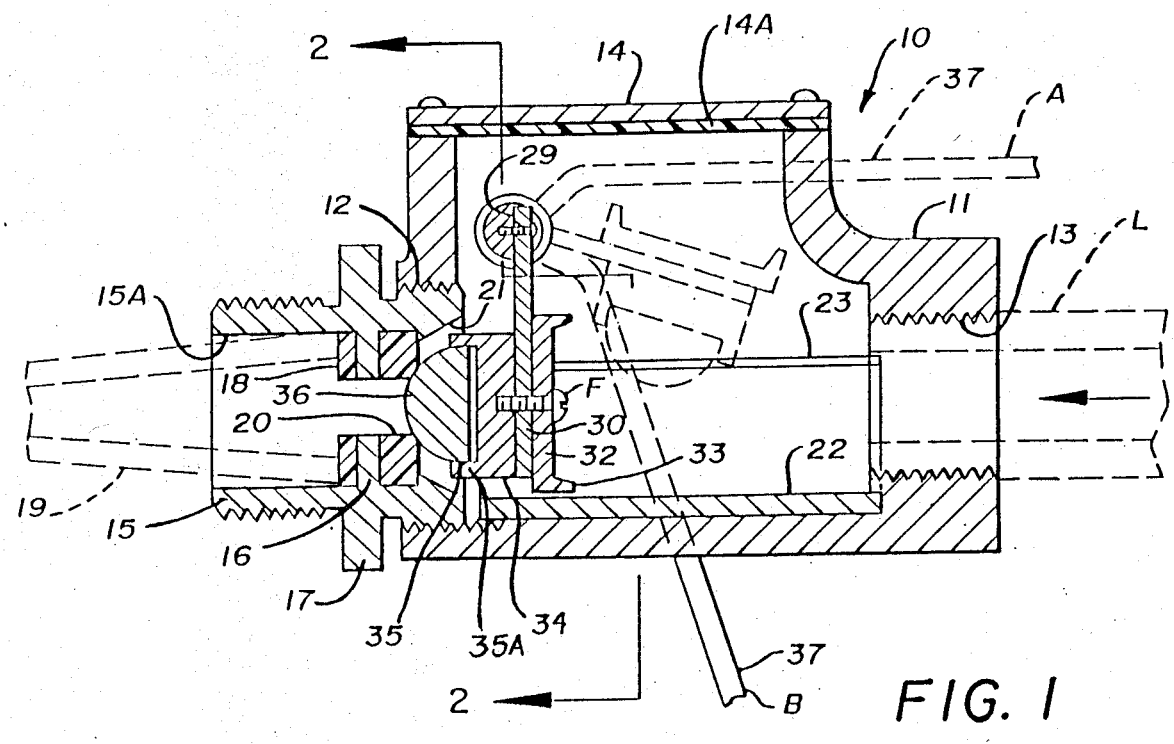
FIG. 1 is a cross sectional view of the shutoff valve nozzle.
Figure 2:
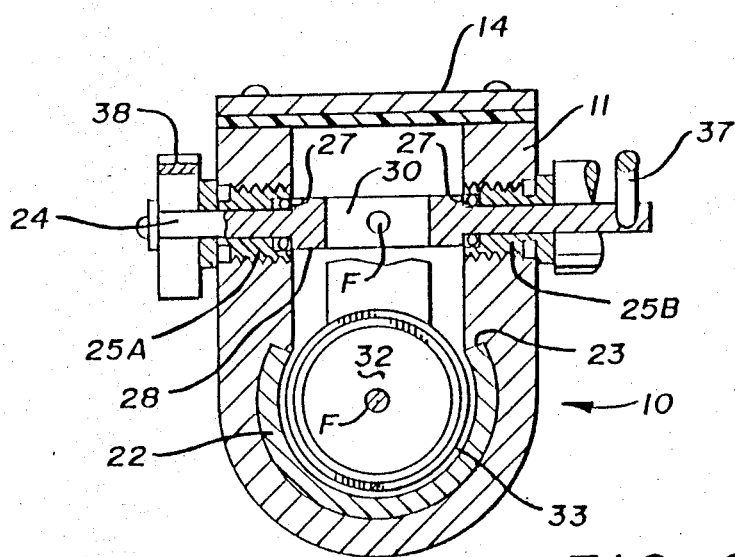
FIG. 2 is a section on lines 2—2 of FIG. 1 of the shutoff valve.

A sandblast nozzle shutoff valve 10 can be seen in FIGS. 1 and 2 of the drawings having a housing 11 with oppositely disposed openings 12 and 13 and a access plate and gasket 14 and 14A positioned therebetween. A nozzle fitting 15 is threadably secured within the opening 12. The nozzle fitting 15 is apertured at 15A with an area of reduced internal diameter defined by an internal annular flange 16. The nozzle fitting 15 is externally threaded between the opening 12 and a annular flange 17. A annular nozzle gasket 18 is positioned on the internal annular flange 16 in sealing relationship to a nozzle 19 shown in broken lines in FIG. 1 of the drawings.

A valve seat gasket 20 is positioned on the other side of said internal annular ring 16. The nozzle fitting is tapered at 21 outwardly along the apertured 15A within the opening 12 in the housing 11. A wear tube 22 is positioned within the housing between the openings 12 and 13 with the upper portion of the tube 22 at 23 cut away.

Referring now to FIG. 2 of the drawings, a control armature 24 can be seen extending transversely through the housing 11 above the wear tube 22. A pair of control armature bushings 25A and 25B are threadably secured in oppositely disposed apertures in the housing. O-rings 27 are positioned around the control armature 24 against the bushings 25 sealing the control armature 24 thereto preventing leaks therearound. A center portion 28 of the control armature 24 is of a larger diameter with a flattened portion 29 within the center portion. A valve flapper 30 having a generally flat rectangular configuration is secured to and extends from the flattened portion 29 by a fastener F. The free end of the valve flapper 30 has its end rounded and is apertured centrally inwardly from its end.

A power cup 32 is of an annular configuration having a right angularly disposed tapered flange 33 extending around its perimeter. The power cup is apertured at its center point and is secured to one side of the valve flapper 30 by a fastener F aligned within registering apertures as here and before described.

A ball stop holder 34 is secured to the other side of said valve flapper opposite the power cup 32. The ball stop holder 34 has an annular recess portion 35 within into which is secured a half arcuate valve seal element 36.

The annular recess portion 35 defines an annular lip 35A on the ball stop holder 34 that extends around a portion of the half arcuate valve seal element 36.

Figure 3:
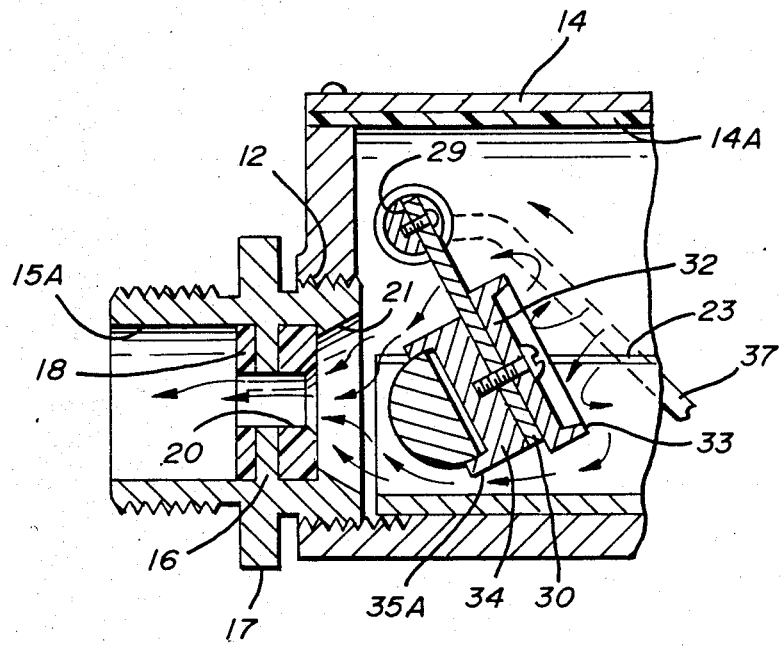
FIG. 3 is a cross sectional view of a portion of the shutoff valve showing flow stream configuration within.

Referring now to FIG. 2 of the drawings, the power cup 32 is secured to the valve flapper 30 so as to be aligned within the wear tube 22 with equal clearance between the perimeter edge of the power cup and the wear tube 22. An equal flow pattern of air and sand between the wear tube and power cup is important during the closure of the valve. It is this flow characteristic around the power cup in combination with the shape of the ball stop holder 34 and its extending annular lip 35A that induces a unique flow pattern around the seal element 36 as best seen in FIG. 3 of the drawings. The flow pattern set up by the annular flange is characteristic of the principles of flow dynamics in that flow will tend to follow the surface contour of a flow disrupting article given the relative velocity of the flow. In this instance it is critical to have the initial contour flow pattern established by the annular flange 33 so that as the flow pattern follows the down stream contours it will engage the annular lip 35A and pass for the most part around the sealing element 36. The greatest potential for abrasive wear to the sealing member occurs as the valve is closed due to the increase velocity through the reduced opening. According to general principles of fluid mechanics, the flow leaving a surface tends to continue along the flow path established at the exit location on the surface. Accordingly, since the flow is divided by the downstream-most location on the annular lip away from the seal, the abrasive mixture will tend to miss that seal thereby reducing abrasion on the arcuate valve seal 36 which is effectively, in this instance, positioned in a "shielded" location with respect to the valve seal.

Referring now to FIGS. 1 and 2 of the drawings, an offset handle 37 can be seen extending from one end of the control armature 24. A spring configuration 38 is connected to the other end of the control arm 24 outside of the housing 11. By moving the offset handle 37 the control armature 24 is rotated, swinging the attached valve flapper towards and away from the opening 12 in the housing 11. The spring configuration 38 urges the handle and the attached control armature constantly towards a closed position requiring the user to pull the handle upwardly towards parallel alignment with the housing in order to open the shutoff valve as seen in broken lines in FIG. 1 of the drawings.

In operation, the valve flapper is moved into the stream of air and sand supplied to the shutoff valve via the inlet line L shown in broken lines extending from the opening 13 in the housing 11. As the valve flapper is advanced the pressurized air and sand stream catches the power cup 32 which has a greater surface area than the valve seal 36 and forces the same towards the opening 12 in the housing. The valve seal 36 registers in sealing relation to the valve seat gasket 20 effectively shutting of the flow of air and sand before the nozzle 19. To open the shutoff valve the operator moves the handle 37 from closed position B in an arcuate fashion to an open position shown in broken lines at position A.

It will be evident from the above description that as the power cup impinges the sand and air stream flow that the differential size configuration of the power cup forces the valve flapper and moves the same with its attached half arcuate valve seal 36 into sealing relation in the aperture while reducing potential abrasion wear on the valve seal 36.

Thus it will be seen that a new and novel sandblast shutoff valve has been illustrated and described and it will be apparent to those skilled in the art that various changes and modifications may be made therein without departing from the spirit of the invention and having thus described my invention, what I claim is:

1. A sandblast nozzle shutoff valve comprising a housing having an outlet nozzle fitting and an inlet supply opening communicating with said nozzle fitting, a nozzle gasket positioned adjacent an area of reduced diameter within said nozzle fitting, a control armature pivotally secured within said housing between said outlet nozzle and said inlet, a valve flapper extending from said control armature, a half arcuate valve seal recessed within a ball stop holder on one side of said valve flapper and aligned for engagement with said nozzle gasket, a power cup having an annular right angularly disposed flange extending around its perimeter portion on the other side of said valve flapper opposite said ball stop holder and in an upstream direction toward said inlet supply opening, said flange being of a diameter greater than that of said ball stop holder and said half arcuate valve seal, a handle secured to said control armature.

2. The sandblast nozzle shutoff valve of claim 1 wherein said control armature has a spring resistance secured thereto.

3. The sandblast nozzle shutoff valve of claim 1 wherein said means for aligning and securing said valve seal and said flapper comprises a ball stop holder removable secured to said flapper by fasteners.

4. The sandblast nozzle shutoff valve of claim 1 wherein said ball stop holder has an annular lip defining a recess in which said half arcuate valve seal is positioned downstream of said power cup on said valve flapper.

5. The sandblast nozzle shutoff valve of claim 1 wherein said annular flange has an inner diameter greater than the outer diameter of said seal element.

* * * * *